United States Patent
Jung et al.

(10) Patent No.: US 8,155,046 B2
(45) Date of Patent: Apr. 10, 2012

(54) APPARATUS AND METHOD FOR INTERFERENCE CANCELLATION AND SYNCHRONIZATION MAINTENANCE OVER INTERFERENCE CHANNEL ESTIMATION IN COMMUNICATION SYSTEM BASED ON FULL-DUPLEX RELAY

(75) Inventors: Sung-Yoon Jung, Seoul (KR); Jong-Ho Lee, Seoul (KR); Sang-Boh Yun, Seongnam-si (KR); Joo-Hyun Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 169 days.

(21) Appl. No.: 12/319,951

(22) Filed: Jan. 14, 2009

(65) Prior Publication Data

US 2009/0180404 A1    Jul. 16, 2009

(30) Foreign Application Priority Data

Jan. 14, 2008   (KR) .................. 10-2008-0003966

(51) Int. Cl.
*H04B 7/14*      (2006.01)
*H04B 3/36*      (2006.01)
*H04B 1/60*      (2006.01)

(52) U.S. Cl. ............... 370/315; 370/279; 455/7; 455/9; 375/211

(58) Field of Classification Search ........... 370/279, 370/315; 375/211; 455/7, 9; 398/39
See application file for complete search history.

(56) References Cited

U.S. PATENT DOCUMENTS

| | | | |
|---|---|---|---|
| 5,875,209 A * | 2/1999 | Ogata | 375/211 |
| 2005/0190821 A1 * | 9/2005 | Fujii et al. | 375/211 |
| 2006/0229017 A1 * | 10/2006 | Larsson et al. | 455/63.1 |
| 2007/0190934 A1 * | 8/2007 | Kim et al. | 455/7 |
| 2008/0008126 A1 * | 1/2008 | Shirakabe et al. | 370/329 |
| 2008/0181174 A1 * | 7/2008 | Cho | 370/329 |
| 2009/0092072 A1 * | 4/2009 | Imamura et al. | 370/315 |
| 2009/0207776 A1 * | 8/2009 | Baik et al. | 370/315 |

* cited by examiner

*Primary Examiner* — Ricky Ngo
*Assistant Examiner* — Paul Masur

(57) ABSTRACT

An apparatus and method for interference cancellation and synchronization maintenance over interference channel estimation in a communication system are provided. An interference channel estimator fixes synchronization and estimates an interference signal. An interference signal controller eliminates the estimated interference signal from a received RF signal. A synchronization unit unfixes fixed synchronization and tracks synchronization when the interference signal cancellation is stable. A data buffer stores data from which the interference signal is canceled.

20 Claims, 3 Drawing Sheets

APPARATUS AND METHOD FOR INTERFERENCE CANCELLATION AND SYNCHRONIZATION MAINTENANCE OVER INTERFERENCE CHANNEL ESTIMATION IN COMMUNICATION SYSTEM BASED ON FULL-DUPLEX RELAY

PRIORITY

The present application claims priority under 35 U.S.C.§119(a) to a Korean Patent Application filed in the Korean Intellectual Property Office on Jan. 14, 2008 and assigned Serial No. 10-2008-0003966, the contents of which are herein incorporated by reference.

TECHNICAL FIELD OF THE INVENTION

The present invention relates generally to an apparatus and method for interference cancellation and synchronization maintenance in a communication system. More particularly, the present invention relates to an apparatus and method for interference cancellation and synchronization maintenance over interference channel estimation in a communication system based on full-duplex relay.

BACKGROUND OF THE INVENTION

At present, the Institute of Electrical and Electronics Engineers (IEEE) 802.16j standardization group is in the process of standardization work for a Mobile Multihop Relay (MMR) technology. Advanced research institutes and enterprises of various global countries conducting research on 4th-Generation (4G) mobile communication are competitively promoting the development of a wireless multihop transmission technology.

Basically, a relay station (RS) demodulates and decodes data received from a transmitter, and then again encodes and modulates the data for transmission to a receiver. The RS enables high-speed data communication by reducing a path loss between wireless links, and enables communication even when the receiver is far away from the transmitter or is located in a shadow area.

In a conventional RS technology, in general, an RS performs transmission and/or reception using different time slots or different frequency resources. That is, the RS operates in a half-duplex. This is because a strong transmitted signal is added to a weak received signal, and the transmitted signal and the received signal interfere with one another if a transmit antenna and receive antenna of the RS are insufficiently isolated from each other. Because of such limitations, an RS may cause a waste of limited wireless resources and thus a deterioration of a system capacity. Also, in order to apply the RS technology to a conventional wireless communication system not taking an RS into consideration, it is required to change standards (such as a frame structure and so forth) for separation of transmission and reception resources.

A method for overcoming general limitations in the conventional RS technology is a full-duplex relay method for enabling transmission and reception by the same resources (e.g., time slot, frequency, and so forth) using interference cancellation. The full-duplex relay method is a method for enabling transmission and reception with the same resources by enabling an RS modulator/demodulator (modem) to estimate and cancel interference of a transmitted signal on a received signal using a digital signal processing technology. A full-duplex RS enables transmission and reception using the same resources. This increases an available resource of an RS, the flexibility of resource allocation, and system capacity. Also, because there is no need for resource separation for reception and transmission, the full-duplex RS can provide a relay service without a standard change of an existing system or through a minimum change thereof.

However, the full-duplex RS requires an interference cancellation technology for canceling interference caused by a transmitted signal of a transmitter in a receiver, and the interference cancellation basically requires estimating an interference channel of the transmitter. Also, because of interference of the transmitter, the full-duplex RS has to perform a process of synchronization considering interference with an existing mobile station (MS). That is, when the full-duplex RS intends to perform synchronization, if interference caused by a transmitted signal of a transmitter is basically generated because of a characteristic of the full-duplex method and thus a conventional synchronization process is performed, synchronization performance is deteriorated by not considering the interference. Therefore, the full-duplex method requires a process of synchronization considering the interference caused by the transmitted signal of the transmitter.

If a full-duplex RS is a Single Input Single Output (SISO) system using a single antenna for a transmitter and receiver, the full-duplex RS can estimate an interference channel of a transmitter using all transmitted signals as pilots. However, if the transmitter/receiver uses Multiple Input Multiple Output (MIMO) using a multiple antenna, orthogonality between transmit signals transmitted from transmit antennas is not kept, thus causing inter-antenna interference and deteriorating performance in estimating an interference channel. Therefore, in an environment with multiple antennas, the interference between antennas must be considered when estimating an interference channel of the transmitter.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for interference cancellation and synchronization maintenance over interference channel estimation in a full-duplex relay station (RS).

The above aspects are achieved by providing an apparatus and method for interference cancellation and synchronization maintenance over interference channel estimation in a communication system based on full-duplex relay.

According to one aspect of the present invention, an apparatus for interference cancellation and synchronization maintenance over interference channel estimation in a communication system based on full-duplex relay is provided. The apparatus includes an interference channel estimator, an interference signal controller, a synchronization unit, and a data buffer. Upon receipt of a radio frequency (RF) signal, the interference channel estimator fixes synchronization and estimates an interference channel from a transmit modem to a receiver modem. The interference signal controller eliminates an estimated interference signal from the received RF signal using the interference channel. When the interference signal cancellation is stable, the synchronization unit unfixes fixed synchronization and tracks synchronization. The data buffer stores data from which the interference signal is canceled.

According to another aspect of the present invention, a method for interference cancellation and synchronization maintenance over interference channel estimation in a communication system based on full-duplex relay is provided. The method includes, upon receipt of a radio frequency (RF) signal, fixing synchronization and estimating an interference channel from a transmit modem to a receiver modem, eliminating an estimated interference signal from the received RF signal using the interference channel, unfixing fixed synchronization and tracking synchronization when the interference signal cancellation is stable, and storing data from which the interference signal is canceled.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE PREFERRED EMBODIMENTS

Figure 1:
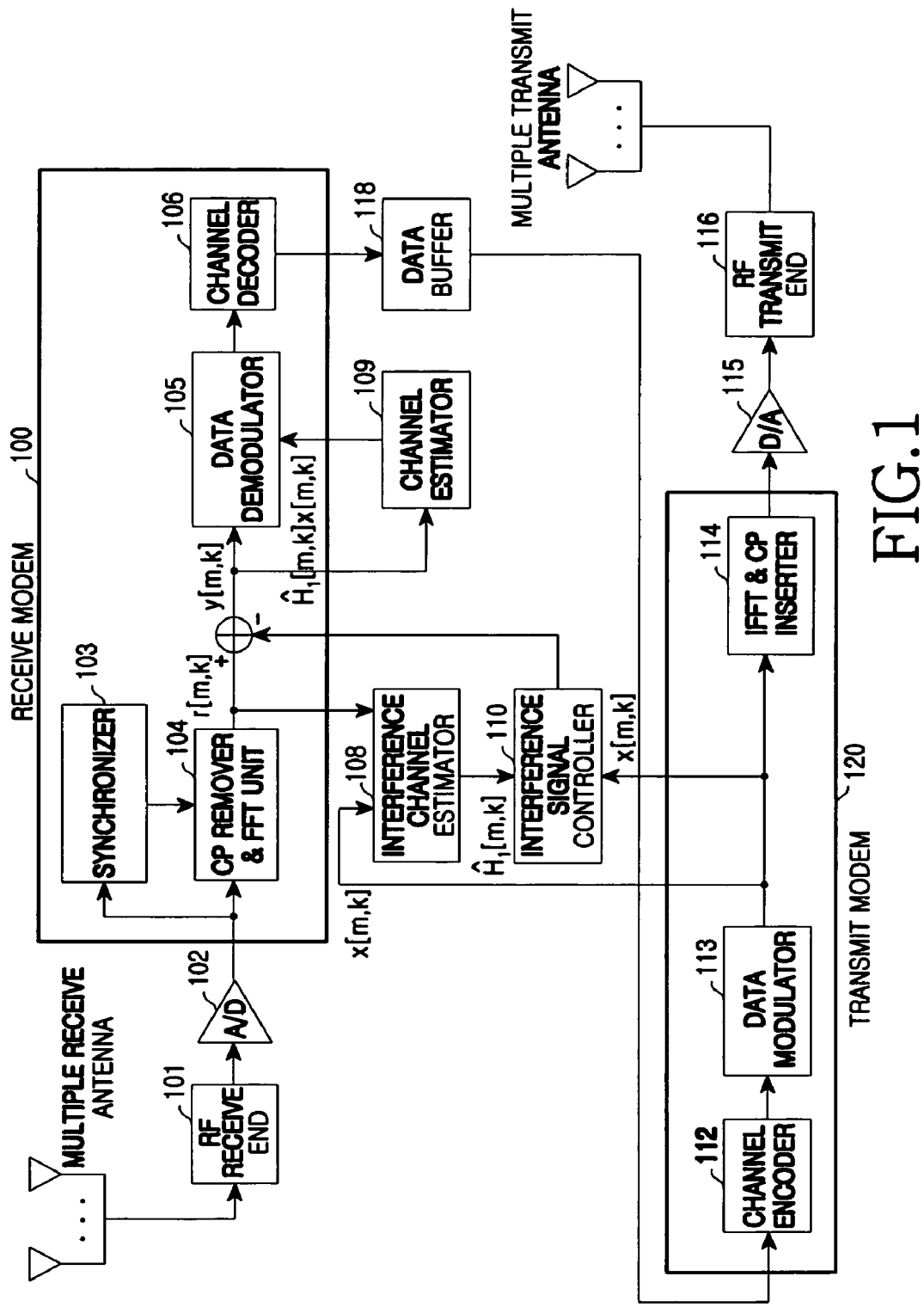
FIG. 1 is a block diagram illustrating a relay station (RS) for performing interference cancellation and synchronization over interference channel estimation in a communication system based on full-duplex relay according to an exemplary embodiment of the present invention.
Figure 2:
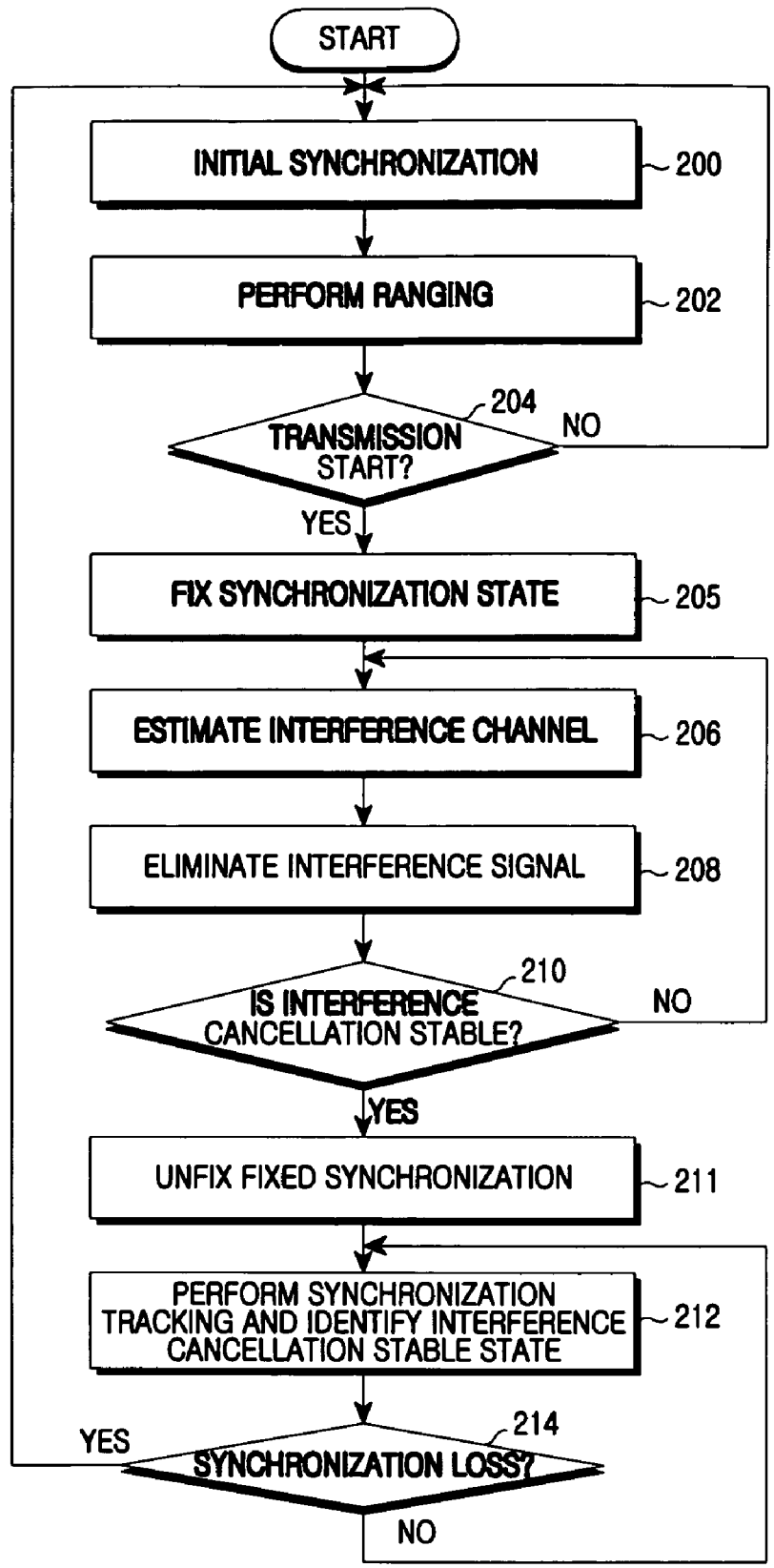
FIG. 2 is a flow diagram illustrating a process of synchronization implementation and synchronization maintenance over interference channel estimation and interference cancellation in a communication system based on full-duplex relay according to an exemplary embodiment of the present invention.
Figure 3:
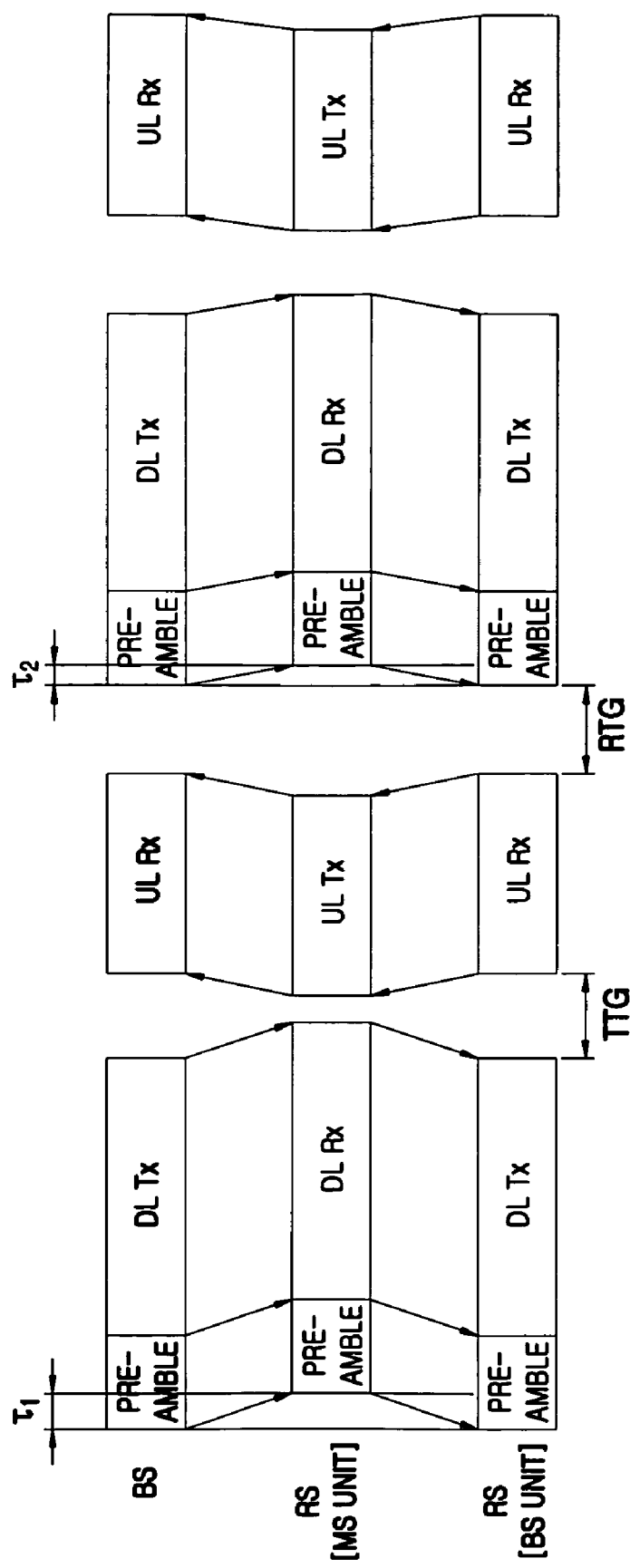
FIG. 3 is a diagram illustrating an example of a synchronization error at each frame.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

An apparatus and method for interference cancellation and synchronization maintenance over interference channel estimation in a communication system based on full-duplex relay according to an exemplary embodiment of the present invention are described below. In an exemplary embodiment of the present invention, a full-duplex relay station (RS) having a multiple antenna structure is described in detail below.

FIG. 1 is a block diagram illustrating an RS for performing interference cancellation and synchronization over interference channel estimation in a communication system based on full-duplex relay according to an exemplary embodiment of the present invention.

As shown in FIG. 1, a full-duplex RS includes a radio frequency (RF) receive end 101, an analog-to-digital (A/D) converter 102, a receive modem 100, a data buffer 118, a transmit modem 120, a digital-to-analog (D/A) converter 115, an RF transmit end 116, an interference channel estimator 108, a channel estimator 109, and an interference signal controller 110. The receive modem 100 includes a synchronizer 103, a Cyclic Prefix (CP) remover and Fast Fourier Transform (FFT) unit 104, a data demodulator 105, and a channel decoder 106. The transmit modem 120 includes a channel encoder 112, a data modulator 113, and an Inverse Fast Fourier Transform (IFFT) & CP inserter 114.

The RF receive end 101 converts an RF signal into a baseband signal and outputs the baseband signal to the A/D converter 102. The A/D converter 102 converts a baseband signal into a digital signal and outputs the digital signal to the receive modem 100.

The receive modem 100 demodulates (105) and decodes (106) data in a signal received through a multiple receive antenna, the RF receive end 101, and the A/D converter 102, and transmits the data to the data buffer 118. If the received signal is an Orthogonal Frequency Division Multiplexing (OFDM) signal, an output signal from the A/D converter 102 is provided to the CP remover & FFT unit 104. The CP remover & FFT unit 104 receives synchronization information from the synchronizer 103, removes a CP from a signal received from the A/D converter 102, and performs FFT operation. The synchronizer 103 finds a CP and a rear portion of a symbol from an output signal of the A/D converter 102 from which an interference signal affecting a receiver is eliminated, and performs symbol synchronization. According to an embodiment, the synchronizer 103 can also obtain a correlation coefficient for a preamble from an output signal of the A/D converter 102 and perform synchronization.

The transmit modem 120 encodes 112 and modulates 113 data of the data buffer 118, and generates and transmits a transmitted signal to the D/A converter 115. If the transmitted signal is an OFDM signal, the transmit modem 120 inserts a CP into a modulated signal through the IFFT & CP inserter 114 before output to the D/A converter 115 and performs IFFT operation. A baseband signal output from the D/A converter 115 is processed into an RF signal through the RF transmit end 116, and is outputted to a multiple transmit antenna and forwarded to a user mobile station (MS). Also, the transmit modem 120 provides a transmitted signal to the interference channel estimator 108 and interference signal controller 110.

The channel estimator 109 extracts a pilot signal from an output signal of the CP remover & FFT unit 104, performs channel estimation, and provides a channel estimation value to the data demodulator 105.

The interference channel estimator 108 receives a transmitted signal from the transmit modem 120, receives a received signal from the receive modem 100, estimates an interference channel from the transmit modem 120 to the receive modem 100, and provides the estimated interference channel to the interference signal controller 110. At this time, the interference channel estimator 108 performs interference channel estimation on a per subcarrier basis.

The interference channel estimation is described below. Although an interference channel of a full-duplex transmitter is almost unchanged over time, if unsynchronization takes place, it is shown as a change in phase rotation upon transmitter interference-channel estimation. Thus, at a time when several transmitter frames are used for estimating an interference channel of a transmitter as in FIG. 3, phase compensation of a channel estimation value by frame should be taken into consideration.

As described above, a full-duplex RS estimates and cancels an interference channel, thereby being able to eliminate an interference signal affecting a receiver. In other words, because the full-duplex RS is aware of all signals intended for transmission, all transmitted signals can use pilots for channel estimation. Accordingly, if unsynchronization occurs, upon channel estimation, it is shown as a change in phase rotation. However, the phase rotation can be prevented by eliminating an interference signal affecting a receiver.

An interference channel estimation method is described in detail below.

Input signals r[m,k] of the receive modem 100 can be expressed in Equation 1 below:

$$r[m, k] = \qquad \text{[Eqn. 1]}$$
$$H[m, k]e^{-j\frac{2\pi k \tau_m}{N}} s[m, k] + H_I[m, k]e^{-j\frac{2\pi k \tau_m}{N}} x[m, k] + n[m, k].$$

In Equation 1, the 's[m,k]' denotes a signal vector of a size $(N_t \times 1)$ including the total number $(N_t)$ of transmission streams that a base station (BS) transmits through a $k^{th}$ subcarrier at an $m^{th}$ symbol, the 'H[m,k]' denotes a multiple antenna channel matrix of a size $(N_r \times N_t)$ from the BS to a receive modem of an RS, the 'x[m,k]' denotes a signal vector of a size $(N_t^{(r)} \times 1)$ including the total number $(N_t^{(r)})$ of transmission streams that are outputs of a transmit modem of the RS, the '$H_I$[m,k]' denotes a multiple antenna interference channel of a size $(N_r^{(r)} \times N_t^{(r)})$ from the transmit modem to the receive modem, the 'm' denotes a symbol index, the 'k' denotes a subcarrier index, the '$\tau_m$' denotes a time delay depending on a synchronization error, the 'N' denotes an FFT size, the $$'e^{-j\frac{2\pi k \tau_m}{N}}'$$

denotes a degree of phase rotation by a synchronization error at the $m^{th}$ symbol, and the 'n[m,k]' denotes a noise signal of the RS. Because it is based on an OFDM system, the assumption is that channels H[m, k] and $H_I$[m,k] are constant at a given OFDM symbol and subcarrier.

The interference channel estimator 108 provides an estimation value $\hat{H}_I$[m,k] of an interference channel $H_I$[m,k] from an input signal r[m,k] to the interference signal controller 110. The transmit modem 120 provides an output signal x[m,k] to the interference signal controller 110. The interference signal controller 110 generates an estimation value $\hat{H}_I$[m,k]·x[m,k] of an interference signal from the two input signals and provides the estimation value $\hat{H}_I$[m,k]·x[m,k] to the receive modem 100. The receive modem 100 can eliminate the interference signal using Equation 2 below:

$$y(m, k) = r[m, k] - \hat{H}_I[m, k]x[m, k] \qquad \text{[Eqn. 2]}$$
$$= H[m, k]e^{-j\frac{2\pi k \tau_m}{N}} s[m, k] +$$
$$\left(H_I[m, k]e^{-j\frac{2\pi k \tau_m}{N}} - \hat{H}_I[m, k]\right) x[m, k] + n[m, k].$$

In Equation 2, the 'y[m,k]' denotes a received signal after interference cancellation. Other parameter description is referred to Equation 1. If estimation of an interference channel is accurate (that is, if $$\hat{H}_I[m, k] = H_I[m, k]e^{-j\frac{2\pi k \tau_m}{N}}),$$

the receive modem 100 can restore a transmitted signal s[m,k] without influence of an interference signal.

To estimate an interference channel $H_I$[m,k], an exemplary embodiment of the present invention proposes two methods below:

First is a moving average and direct inversion interference channel estimation method; and Second is a recursive interference channel estimation method.

The moving average and direct inversion interference channel estimation method is described below.

First, a received signal r[m,k] is preprocessed using a signal x[m,k] transmitted by a transmit modem 120 as in Equation 3 below:

$$z[m, k] \triangleq r[m, k]x^H[m, k] \qquad \text{[Eqn. 3]}$$
$$= H[m, k]e^{-j\frac{2\pi k \tau_m}{N}} s[m, k]x^H[m, k] +$$
$$H_I[m, k]e^{-j\frac{2\pi k \tau_m}{N}} x[m, k]x^H[m, k] + n[m, k]x^H[m, k].$$

In Equation 3, the 'z[m,k]' denotes a preprocessed input signal of a receive modem, the 'r[m,k]' denotes an input signal of the receive modem, the '(·)H' denotes a Hermitian operation, and the x[m,k] denotes an output signal of a transmit modem. Other parameter description is referred to Equation 1.

Here, a moving average value, which is an accumulation of a preprocessed signal z[m,k] for 'W' number of symbols to obtain an average gain, can be obtained in Equation 4 below:

$$\sum_{j=0}^{W-1} z[m-j, k] \approx \qquad \text{[Eqn. 4]}$$
$$\sum_{j=0}^{W-1} H[m-j, k]e^{-j\frac{2\pi k \tau_{m-j}}{N}} s[m-j, k]x^H[m-j, k] +$$
$$H_I[m-j, k]e^{-j\frac{2\pi k \tau_{m-j}}{N}} \sum_{j=0}^{W-1} x[m-j, k]x^H[m-j, k] +$$
$$\sum_{j=0}^{W-1} n[m-j, k]x^H[m-j, k].$$

A description of the parameters is referred to Equations 1 and 3.

In Equation 4, the term $x[m-j, k]x^H[m-j,k]$ shows correlation between transmitted signals by antenna resulting from a MIMO structure. Under the assumption that the transmitted signals by antenna are independent from each other, correlation between antennas decreases, thus making it possible to estimate an interference channel of a transmit end. However, if an average duration is larger than time selectivity of a channel, performance is rather deteriorated.

Therefore, rather than removing correlation between transmitted signals by antenna using only an average gain, a correlation matrix is estimated and decorrelation is performed through direct inversion and thus, interference channel estimation can be expressed as in Equation 5 below:

$$\hat{H}_I[m, k] = \left(\sum_{j=0}^{W-1} z[m-j, k]e^{-j\frac{2\pi k \tau_{m-j}}{N}}\right) \left(\sum_{j=0}^{W-1} x[m-j, k]x^H[m-j, k]\right)^{-1} e^{-j\frac{2\pi k \tau_m}{N}}.$$ [Eqn. 5]

In Equation 5, a description of the parameter is referred to Equations 1 and 3.

The recursive interference channel estimation method is described below.

In the moving average and direct inversion method, a complexity caused by matrix inversion increases if a MIMO size increases. Also, because there is an assumption that a channel does not change during an average duration to obtain an average gain, if a coherent time is less than the average duration because of a channel change by time selectivity, it is difficult to estimate a channel adaptively to a change of an average channel. In order to solve such a problem, an exemplary embodiment of the present invention proposes the recursive interference channel estimation method based on more adaptive weighted averaging according to a channel change without using the direct inversion method.

Weighted averaging is taken using a preprocessed signal $z[m,k]$ of Equation 3, as in Equation 6 below:

$$\sum_{j=0}^{m} \lambda^{m-j} z[j, k] \approx \sum_{j=0}^{m} \lambda^{m-j} H[j, k] e^{-j\frac{2\pi k \tau_j}{N}} s[j, k] x^H[j, k] +$$ [Eqn. 6]

$$H_I[m, k] e^{-j\frac{2\pi k \tau_j}{N}} \sum_{j=0}^{m} \lambda^{m-j} x[j, k] x^H[j, k] +$$

$$\sum_{j=0}^{m} \lambda^{m-j} n[j, k] x^H[j, k].$$

In Equation 6, the '$\lambda$' denotes a weight parameter, and other parameter description is referred to Equations 1 and 3.

If using the existing direct inversion method for a weighted averaging signal in Equation 6, a transmitter MIMO interference channel can be estimated as in Equation 7 below:

$$\hat{H}_I[m, k] = \left(\sum_{j=0}^{m} \lambda^{m-j} z[j, k] e^{e^{-j\frac{2\pi k \tau_j}{N}}}\right) \left(\sum_{j=0}^{m} \lambda^{m-j} x[j, k]x^H[j, k]\right)^{-1} e^{-j\frac{2\pi k \tau_m}{N}}.$$ [Eqn. 7]

However, in the recursive method, without using the weighted averaging and direct inversion in Equation 7, a transmitter MIMO interference channel can be also estimated as in Equation 8 below:
when $$C[m, k] \doteq \sum_{j=0}^{m} \lambda^{m-j} z[j, k] e^{-j\frac{2\pi k \tau_m}{N}}, \Phi[m, k] = \left(\sum_{j=1}^{m} \lambda^{m-j} x[j, k]x^H[j, k]\right)^{-1}.$$

In the recursive method, $C[m,k]$ and $\Phi[m,k]$ are estimated, and thus a transmitter interference channel is estimated as expressed in Equation 8 below:

$$C[m, k] = \lambda C[m-1, k] + z[m, k]e^{j\frac{2\pi k \tau_m}{N}}$$ [Eqn. 8]

$$\Phi[m, k] = \lambda^{-1}\Phi[m-1, k] -$$

$$\lambda^{-1} \frac{\lambda^{-1}\Phi[m-1, k]x[m, k]}{1 + \lambda^{-1}x^H[m, k]\Phi[m-1, k]x[m, k]} x^H[m, k]\Phi[m-1, k]$$

In Equation 8, initial values are set as $$C[0, k] = z[0, k]e^{j\frac{2\pi k \tau_0}{N}}$$

and $\Phi[0, k]=I$.

The interference signal controller 110 generates an interference signal estimation value for each subcarrier using an interference channel estimation value from the interference channel estimator 108 and a transmitted signal from the transmit modem 120, and provides the interference signal estimation value to the receive modem 100.

Here, the receive modem 100 eliminates an interference signal from a received signal using an interference signal estimation value, and then performs data demodulation and decoding.

FIG. 2 is a flow diagram illustrating a process of synchronization maintenance over interference cancellation in a communication system based on full-duplex relay according to an exemplary embodiment of the present invention.

Referring to FIG. 2, in step 200, an RS performs preset initial synchronization in a state of no transmission and, in step 202, performs ranging. Here, upon a success of ranging, a propagation delay is calculated, thus being able to determine transmission timing.

Then, upon a start of transmission (or reception) in step 204, the RS fixes a present synchronization state (that is, stops synchronization tracking and fixes synchronization at a predetermined time) in step 205. Then, in step 206, the RS estimates an interference channel $H_I[m,k]$ using a transmitted signal and a received signal. In order to estimate the interference channel $H_I[m,k]$, an exemplary embodiment of the present invention can use two methods:

First is a moving average and direct inversion interference channel estimation method (Equation 5); and Second is a recursive interference channel estimation method (Equation 8).

Then, in step 208, the RS removes an interference channel estimation value from a received signal, eliminating an interference signal.

Then, in step 210, the RS checks if an error value is less or equal to a preset threshold value, thus determining if interference cancellation is stable. If the interference cancellation is not stable (i.e., if the error value is more than the threshold value), the RS returns to step 206. If the interference cancellation is stable (i.e., if the error value is equal to or less than the threshold value), in step 211, the RS unfixes fixed synchronization and, in step 212, performs synchronization tracking and identifies an interference cancellation stable state. That is, after fixing synchronization until interference cancellation is stabilized, the RS estimates an interference channel and eliminates an interference signal.

Then, in step 214, the RS identifies if there is any synchronization loss. As long as there is a synchronization loss, the RS stops transmission and performs initial synchronization of step 200. If there is no synchronization loss, the RS returns to step 212 and again performs synchronization tracking and identifies an interference cancellation stable state.

After that, the RS terminates a process according to an exemplary embodiment of the present invention.

As described above, because there is interference by a transmitter in a full-duplex relay method, a synchronization process considering the interference has to be performed. That is, the synchronization process of the full-duplex relay method has to be performed in association with an interference cancellation technique.

As described above, an exemplary embodiment of the present invention has an advantage of being capable of maintaining stable synchronization by, together with interference channel estimation and elimination, performing a synchronization process in association with the interference channel estimation and elimination in a communication system based on full-duplex relay. Also, transmission/reception can be performed using the same wireless resources because of interference cancellation, thus being able to increase available resources, flexibility of resource allocation, and system capacity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for interference cancellation and synchronization maintenance over interference channel estimation in a communication system based on full-duplex relay, the apparatus comprising:

a receive modem configured to provide received signals, fix synchronization when interference cancellation is not stable, and unfix fixed synchronization when the interference cancellation is stable;

an interference channel estimator configured to estimate an interference channel between a transmit modem and the receive modem, upon receipt of a received signal;

an interference signal controller configured to cancel an interference signal from the received signal using the estimated interference channel;

a data buffer configured to store data decoded after the estimated interference signal is canceled, wherein the interference signal is caused by a transmission signal from the transmit modem.

2. The apparatus of claim 1, wherein the transmit modem is configured to transmit the data stored in the data buffer.

3. The apparatus of claim 1, wherein the receive modem is configured to perform initial synchronization prior to fixing synchronization.

4. The apparatus of claim 1, wherein, if there is synchronization loss, the transmit modem is configured to stop data transmission, and the receive modem is further configured to perform initial synchronization.

5. The apparatus of claim 1, wherein, when the interference signal cancellation is not stable, the receive modem is configured to stop synchronization tracking, fix synchronization, and repeatedly eliminate the estimated interference signal.

6. The apparatus of claim 1, further comprising a channel estimator configured to perform channel estimation after the interference signal is canceled.

7. The apparatus of claim 1, wherein the interference channel estimator is configured to estimate the interference channel in a moving average and direct inversion method of accumulating a received signal for a predetermined symbol.

8. The apparatus of claim 1, wherein the interference channel estimator is configured to recursively estimate the interference channel on the basis of weighted averaging.

9. The apparatus of claim 1, wherein the interference channel is estimated using an equation below:

$$\hat{H}_I[m, k] = \left(\sum_{j=0}^{W-1} z[m-j, k]e^{-j\frac{2\pi k \tau_{m-j}}{N}}\right)\left(\sum_{j=0}^{W-1} x[m-j, k]x^H[m-j, k]\right)^{-1} e^{-j\frac{2\pi k \tau_m}{N}},$$

where 'W' denotes a number of symbols to obtain an average gain, '$z[m,k]$' denotes a preprocessed input signal of the receive modem, '$x[m,k]$' denotes a signal vector of a size ($N_t^{(r)} \times 1$) including a total number ($N_t^{(r)}$) of transmission streams that are outputs of the transmit modem, '$(\cdot)^H$' denotes a Hermitian operation, 'm' denotes a symbol index, 'j' denotes an offset of a symbol index, 'k' denotes a subcarrier index, '$\tau_m$' denotes a time delay depending on a synchronization error, 'N' denotes a Fast Fourier Transform (FFT) size, and $$`e^{-j\frac{2\pi k \tau_m}{N}},$$

denotes a degree of phase rotation by a synchronization error at an $m^{th}$ symbol.

10. The apparatus of claim 1, wherein the interference channel is estimated using an equation below:

$$\hat{H}_I[m, k] = \left(\sum_{j=0}^{m} \lambda^{m-j} z[j, k]e^{e\frac{2\pi k \tau_j}{N}}\right)\left(\sum_{j=0}^{m} \lambda^{m-j} x[j, k]x^H[j, k]\right)^{-1} e^{-j\frac{2\pi k \tau_m}{N}},$$

Where '$Z[j,k]$' denotes a preprocessed input signal of the receiver modem, '$x[j, k]$' denotes a signal vector of a size ($N_t^{(r)} \times 1$) including a total number ($N_t^{(r)}$) of transmission streams that are outputs of the transmit modem, '$(\cdot)^H$' denotes a Hermitian operation, 'm' denotes a symbol index, 'j' denotes an offset of a symbol index, 'k' denotes a subcarrier index, '$\tau_m$' denotes a time delay depending on a synchronization error, 'N' denotes a Fast Fourier Transform (FFT) size, $$\text{`}e^{-j\frac{2\pi k\tau_m}{N}}\text{,}$$

denotes a degree of phase rotation by a synchronization error at an $m^{th}$ symbol, and '$\lambda$' denotes a weight parameter.

11. A method for interference cancellation and synchronization maintenance over interference channel estimation in a communication system based on full-duplex relay, the method comprising:
   providing received signals;
   estimating an interference channel between a transmit modem and a receive modem, upon receipt of a signal;
   canceling an interference signal from the received signal using the estimated interference channel; and
   storing data decoded from the received signal after the interference signal is canceled,
   wherein synchronization is fixed when interference cancellation is not stable,
   wherein the fixed synchronization is unfixed and synchronization tracking is performed when the interference cancellation is stable, and
   wherein the interference signal is caused by a transmission signal from the transmit modem.

12. The method of claim 11, further comprising transmitting the stored data.

13. The method of claim 11, further comprising performing initial synchronization prior to fixing synchronization.

14. The method of claim 11, further comprising, if there is synchronization loss, stopping data transmission and performing initial synchronization.

15. The method of claim 11, wherein, when the interference signal cancellation is not stable, synchronization tracking is stopped, synchronization is fixed, and the estimated interference signal is repeatedly eliminated.

16. The method of claim 11, further comprising performing channel estimation for the received signal after the interference signal is canceled.

17. The method of claim 11, wherein the interference channel is estimated in a moving average and direct inversion method of accumulating a received signal for a predetermined symbol.

18. The method of claim 11, wherein the interference channel is recursively estimated on the basis of weighted averaging.

19. The method of claim 11, wherein the interference channel is estimated using an equation below:

$$\hat{H}_I[m,k] = \left(\sum_{j=0}^{W-1} z[m-j,k]e^{-j\frac{2\pi k\tau_{m-j}}{N}}\right)\left(\sum_{j=0}^{W-1} x[m-j,k]x^H[m-j,k]\right)^{-1} e^{-j\frac{2\pi k\tau_m}{N}},$$

Where 'W' denotes a number of symbols to obtain an average gain, 'z[m,k]' denotes a preprocessed input signal of the receive modem, '[m,k]' denotes a signal vector of a size ($N_t^{(r)} \times 1$) including a total number ($N_t^{(r)}$) of transmission streams that are outputs of the transmit modem, '$(\cdot)^H$' denotes a Hermitian operation, 'm' denotes a symbol index, 'j' denotes an offset of a symbol index, 'k' denotes a subcarrier index, '$\tau_m$' denotes a time delay depending on a synchronization error, 'N' denotes a Fast Fourier Transform (FFT) size, and $$\text{`}e^{-j\frac{2\pi k\tau_m}{N}}\text{,}$$

denotes a degree of phase rotation by a synchronization error at an $m^{th}$ symbol.

20. The method of claim 11, wherein the interference channel is estimated using an equation below:

$$\hat{H}_I[m,k] = \left(\sum_{j=0}^{m} \lambda^{m-j} z[j,k]e^{e\frac{2\pi k\tau_j}{N}}\right)\left(\sum_{j=0}^{m} \lambda^{m-j} x[j,k]x^H[j,k]\right)^{-1} e^{-j\frac{2\pi k\tau_m}{N}},$$

where 'Z[j,k]' denotes a preprocessed input signal of the receiver modem, 'x[j,k]' denotes a signal vector of a size ($N_t^{(r)} \times 1$) including a total number ($N_t^{(r)}$) of transmission streams that are outputs of the transmit modem, '$(\cdot)^H$' denotes a Hermitian operation, 'm' denotes a symbol index, 'j' denotes an offset of a symbol index, 'k' denotes a subcarrier index, '$\tau_m$' denotes a time delay depending on a synchronization error, 'N' denotes a Fast Fourier Transform (FFT) size, $$\text{`}e^{-j\frac{2\pi k\tau_m}{N}}\text{,}$$

denotes a degree of phase rotation by a synchronization error at an $m^{th}$ symbol, and '$\lambda$' denotes a weight parameter.

* * * * *